Patented June 21, 1949

2,474,184

UNITED STATES PATENT OFFICE 2,474,184

METHOD OF PURIFYING GLUTAMIC ACID AMIDES OF PTEROYLGLUTAMIC ACID

Erwin Kuh, New Brunswick, and James M. Smith, Jr., North Plainfield, N. J., assignors to American Cyanamid Company, New York, N. Y., a corporation of Maine No Drawing. Application August 13, 1946, Serial No. 690,348

7 Claims. (Cl. 260—251)

This invention relates to a process of purifying synthetically produced glutamic acid amides of pteroic acid. These products have proven to be of considerable therapeutic value because of their usefulness in stimulating haemoglobin formation and in the treatment of agranulocytosis, sprue, and other related diseases.

The synthetic production of substances having the identical, or analogous, biological activity of folic acid derived from natural sources has recently been achieved by reacting 2,4,5-triamino-6-hydroxypyrimidine, an amino acid amide of para-aminobenzoic acid such as para-aminobenzoyl glutamic acid, and an appropriate three carbon compound having reactive aldehyde and/or halogen groups, such as particularly alpha, beta-dibromopropionaldehyde.

The most important biologically active product of the reaction bears the chemical name N-[4 - {[(2 - amino - 4 - hydroxy - 6 - pyrimido - [4,5 - b]pyrazyl)methyl] - amino}benzoyl] glutamic acid but for common usage has been assigned the name "pteroylglutamic acid." Note Science, May 31, 1946, vol. 103, page 669. Other closely related products having biological activity in varying degree may be prepared by the process by using suitable starting materials in which the glutamic acid radical of the para-aminobenzoyl glutamic acid intermediate is replaced with another amino acid or a polypeptid thereof, such, for example, being para-aminobenzoylglutamylglutamylglutamic acid. This latter product is a glutamic acid amide of pteroic acid and is called, using the simplified nomenclature of Science above, pteroylglutamylglutamylglutamic acid. This and other biologically active amino acid amides of 4-{[(2-amino-4-hydroxy-6-pyrimido[4,5-b]pyrazyl)methyl]-amino} benzoic acid and particularly the glutamic acid amides having one, two, three and more glutamic acid radicals connected by the peptid linkage are included within the scope of the present invention.

The chemistry of the process by which these glutamic acid amides of pteroic acid are prepared is highly complex, particularly inasmuch as the different intermediates mentioned above may react in several different ways. Chemists familiar with the chemistry of heterocyclic, organic compounds of this type would expect, and it has been found by experience, that numerous side reactions occur along with, or following, the principal reaction. Accordingly, the reaction product contains a relatively large proportion of undesired substances, including unreacted intermediates, condensation and/or polymerization products of two or more of the intermediates, position isomers, oxidation products, various hypothetical degradation products, products of hydrolysis, and the like. Many of these unidentified products contain a pyrimidopyrazine nucleus and may be designated generally as pterins. Some of the by-products of the reaction may be harmful and, inasmuch as the product is to be used as a therapeutic agent, it is obvious that these pterins should be separated from the desirable biologically active material.

Unfortunately, many of the pterins in the crude reaction product possess some of the same chemical and physical properties of the desired biologically active product and it has been found extremely difficult to separate the impurities without causing an alarming loss of the active material. Methods have been devised which make it possible to obtain pteroylglutamic acid of 85 to 90% purity from the crude reaction mixture but higher purity has been achieved only with a very great loss of the active constituents of the crude mixture.

We have discovered that pteroylgutamic acid of almost theoretical purity can be separated from mixtures containing pterins and other impurities which are found in the reaction product when pteroylglutamic acid is prepared by synthetic means. The purification process is relatively simple and depends upon the fact that the magnesium salts of pteroylglutamic acid and related amino acid amides of pteroic acid are unique and possess solubility properties differing from those of the contaminating pterins to such degree that they can be separated therefrom by simple solution, filtration, and precipitation, either by crystallization from hot concentrated aqueous solution or as the free acid upon treatment with an acid.

Although the process of the present invention is particularly adapted to the purification of pteroylglutamic acid preparations containing from about 80 to 90% pteroylglutamic acid in the presence of other pterins, it may also be used in the purification of crude reaction products containing as low as 10% of real pteroylglutamic acid.

In carrying out the process the impure pteroylglutamic acid preparation containing related pterins is treated with a magnesium compound to convert the pterolyglutamic acid to its magnesium salt. Magnesium oxide is the preferred magnesium compound for this purpose but other magnesium compounds reactive with pteroylglutamic acid to produce the magnesium salt thereof, such as magnesium carbonate, may be employed. The magnesium salt may also be formed in solution from another one of its soluble salts by methods of double decomposition as illustrated in some of the examples. The magnesium salt solution is clarified by filtration, decantation, centrifugation, or otherwise, to remove the insoluble impurities. Pteroylglutamic acid of improved purity may then be obtained by simple acidification with an acid to, preferably, about pH 3. The insoluble pteroylglutamic acid which crystallizes from solution may then be recovered by filtration. This process may be repeated until the product is of the desired purity.

A better purification is accomplished by preparing a concentrated solution of magnesium pteroylglutamate in water at a temperature of between 75° to 100° C. at which temperature the solution is filtered and the magnesium salt recovered by cooling the concentrated solution. The magnesium pteroylglutamate can be recrystallized from water until a product of desired purity is obtained. Acidification of a solution of the magnesium salt results in the precipitation of pteroylglutamic acid crystals of high purity. To illustrate the invention in greater particularity the following examples are given.

Example 1

10 g. of a crude reaction product containing 15.7% by weight of real pteroylglutamic acid, the remainder being related pterins and other unidentified products of the reaction, is mixed in a mortar with 6 g. of magnesium oxide and then slurried in 1500 cc. of water and heated to 40° C. The solution is then filtered and the filter cake washed with water. The filtrate is then acidified with dilute hydrochloric acid to pH 3 and the precipitate is collected by filtration and washed with water and alcohol. The purity of the product was increased to 34% of theoretical.

Example 2

About 1.6 g. of pteroylglutamic acid of 78% purity and containing related pterins is dissolved in 800 cc. of N/10 sodium hydroxide solution. 8 g. of Hyflo Supercel (diatomaceous earth) is added and the pH of the solution adjusted to approximately 3 with acetic acid. The precipitate is collected on a filter and washed with water. The wet filter cake is slurried in 500 cc. of water with 5 g. of magnesium oxide and the mixture heated to 55–60° C. The insoluble material is removed by filtration and the filter cake is washed in a little hot water. The filtrate is treated with a solution of caustic soda to a pH of about 11.5, filter aid is added and the solution filtered. The filtrate is heated to 60° C. and poured into a hot solution of 25 cc. of acetic acid and 75 cc. of water. The mixture is cooled to 50° C. and filtered. After washing the product with water and with alcohol and drying, the pteroylglutamic acid recovered was found to have a purity of 87.3%.

Example 3

1 g. of pteroylglutamic acid of 93.1% purity is slurried in 50 cc. of water and 0.5 g. of magnesium oxide. The mixture is then heated to boiling and filtered. Upon cooling the filtrate, a yellow precipitate of magnesium pteroylglutamate in the form of thin needles is obtained. The solution is filtered and the wet filter cake is dissolved in about 25 cc. of boiling water. On cooling, a precipitate of the yellow magnesium salt is again obtained and collected on a filter. After recrystallization of magnesium pterolyglutamate from water five times the product is dried at 115° C. for 3½ hours at a pressure of .5 mm. of mercury. On analysis the product was found to be 98% pure.

Example 4

After recrystallizing magnesium pteroylglutamate three times from water the salt is added slowly to a hot 30% acetic acid solution. Upon cooling, pteroylglutamic acid is precipitated and recovered by filtration. After drying, at 115° C. for 3½ hours at a pressure of .5 mm. of mercury, the product was analyzed and found to contain pteroylglutamic acid of 98% purity.

Example 5

The magnesium hydroxide precipitated from 30 g. $MgSO_4 \cdot 7H_2O$ in one liter of water by means of ammonia is collected on the filter, washed with water, and mixed with 10 grams of pteroylglutamic acid (86.0% by chemical assay, and 7.1% water) in 400 cc. water. More magnesium hydroxide which has been precipitated from 30 g. $MgSO_4 \cdot 7H_2O$ in 1000 cc. water with sodium hydroxide, filtered and washed with water is then added. The slurry is then heated to 85° C. It gives a pink spot on phenolphthalein test paper. The hot mixture is filtered, and the straw colored filtrate is cooled. The yellow cake which precipitates is dissolved in 200 cc. water at 85° C. On cooling, a yellow precipitate appears, which is collected on the filter and then dissolved in 100 cc. water at 85° C. It is allowed to cool slowly and stand about 16 hours. An orange precipitate is then present at the bottom of the beaker, with a light yellow precipitate above. The light yellow material is removed and collected on the filter. It is dissolved in 100 cc. hot water and the solution is added to 50 cc. 30% acetic acid at 85° C. The crystalline product is dried in a vacuum desiccator over solid sodium hydroxide and anhydrous calcium sulfate for 24 hours and then 5 hours at 115° C. under 0.5 mm. mercury vacuum. It contains 97.8% pteroylglutamic acid by chemical assay.

Example 6

A slurry of 2 g. pteroylglutamic acid, 86.0% pteroylglutamic acid, in 100 cc. water is treated with 1 g. calcium hydroxide at 85° C. Most of the yellow solid dissolved. The insolubles are removed by hot filtration. After cooling to about 60° C., the filtrate is treated with a solution of one gram $MgSO_4 \cdot 7H_2O$ in a little water. The small amount of precipitated material is removed by filtration, and the filtrate is diluted with an equal volume of ethanol. A voluminous yellow precipitate appears, and is collected on the filter. This material can be recrystallized from water; however in this example it is dissolved in hot water and clarified, then added to 50 cc. of 50% acetic acid at about 80° C. After cooling, the precipitated material is collected on the filter and dried in the air at 60° C. There is obtained 1.127 g. of material, containing 86.9% pteroylglutamic acid and 8.1% water.

Example 7

A slurry of one gram pteroylglutamic acid (86.0% pteroylglutamic acid; 7.1% water, in 50 cc. water is treated with 1 gram calcium hydroxide at 80–85° C. After filtering hot the filtrate is treated with 0.3 g. magnesium sulfate heptahydrate, dissolved in a little water. The precipitated material is removed by clarification, and the filtrate is added to an excess of hot dilute acetic acid (50 cc. of 50%). After cooling the yellow precipitate is collected on the filter, washed with water and with acetone, and dried at 60° C. The resulting material contains 90.0% pteroylglutamic acid and 7.7% water.

I claim:

1. A method of separating glutamic acid amides of pteroic acid from related pterins in association therewith which comprises the steps of preparing an aqueous solution of magnesium pteroylglutamate, separating insoluble bodies from the soluble magnesium pteroylglutamate, and thereafter acidifying the solution to obtain a precipitate of a glutamic acid amide of pteroylglutamic acid and recovering the said precipitate.

2. A method of separating glutamic acid amides of pteroic acid from related pterins in association therewith which comprises the steps of treating a mixture containing a glutamic acid amide of pteroic acid and related pterins with a magnesium compound to obtain magnesium pteroylglutamate, dissolving the magnesium pteroylglutamate in water, separating insoluble bodies from the soluble magnesium pteroylglutamate, and thereafter acidifying the solution to obtain a precipitate of a glutamic acid amide of pteroylglutamic acid of increased purity and recovering the said precipitate.

3. In a method of separating pteroylglutamic acid from related pterins in association therewith the steps of preparing a hot concentrated aqueous solution of magnesium pteroylglutamate, separating insoluble bodies from the soluble magnesium pteroylglutamate, cooling the solution to obtain a precipitate of magnesium pteroylglutamate, separating the precipitate and redissolving in hot water and thereafter acidifying the solution to obtain a precipitate of pteroylglutamic acid of increased purity and recovering the said precipitate.

4. A method of purifying pteroylglutamic acid which comprises the steps of dissolving impure pteroylglutamic acid in an alkaline solution, converting the pteroylglutamate to a magnesium salt thereof, separating the insoluble material from the solution and thereafter precipitating pteroylglutamic acid in a higher degree of purity from the solution by acidification thereof and recovering the said precipitate.

5. A method of purifying pteroylglutamic acid which comprises dissolving impure pteroylglutamic acid in an aqueous solution of calcium hydroxide, treating the solution with magnesium sulfate to convert the calcium pteroylglutamate to magnesium pteroylglutamate, separating the insoluble material from the solution and thereafter precipitating pteroylglutamic acid of improved purity from the solution by acidification thereof and recovering the said precipitate.

6. A method of purifying pteroylglutamic acid which comprises dissolving impure pteroylglutamic acid in an aqueous solution of calcium hydroxide, treating the solution with magnesium sulfate to convert the calcium pteroylglutamate to magnesium pteroylglutamate, separating the insoluble material from the solution and thereafter diluting the solution with ethanol and recovering a precipitate of magnesium pteroylglutamate.

7. A method of separating pteroylglutamylglutamyglutamic acid from pterins in association therewith which comprises the steps of treating a mixture contain pteroylglutamylglutamyglutamic acid and other pterins with a magnesium compound to obtain the magnesium salt of said pteroylglutamylglutamyglutamic acid, dissolving the magnesium salt in water, separating insoluble bodies from the soluble magnesium pteroylglutamylglutamylglutamate, and thereafter acidifying the solution to obtain a precipitate of pteroylglutamylglutamylglutamic acid of increased purity and recovering the said precipitate.

ERWIN KUH.
JAMES M. SMITH, Jr.

No references cited.